United States Patent [19]

Freyermuth et al.

[11] 3,853,910

[45] Dec. 10, 1974

[54] PRODUCTION OF SUBSTITUTED ETHERS OF -2-PYRROLIDINONES

[75] Inventors: Harlan B. Freyermuth; David I. Randall, both of Easton, Pa.

[73] Assignee: GAF Corporation, New York, N.Y.

[22] Filed: Nov. 1, 1972

[21] Appl. No.: 302,801

Related U.S. Application Data

[63] Continuation-in-part of Ser. No. 23,448, March 27, 1970, abandoned.

[52] U.S. Cl. .................................. 260/326.5 FL
[51] Int. Cl. ............................................ C07d 27/04
[58] Field of Search ......................... 260/326.5 FL

[56]  References Cited
UNITED STATES PATENTS 3,188,317   6/1965   Hickner ............................. 260/307

Primary Examiner—Joseph A. Narcavage
Attorney, Agent, or Firm—Walter C. Kehm; Samson B. Leavitt

[57] ABSTRACT

N-substituted ethers of 2-pyrrolidinone of the structural formula:

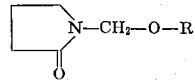

wherein R represents hydrocarbon or substituted hydrocarbon group such as alkyl, alkenyl, alkynyl, cycloalkyl, aryl, aralkyl and alkaryl, useful as organic solvents, are prepared by the reaction of N-hydroxymethyl-2-pyrrolidinone with the appropriate alcohol in the presence of an acid catalyst at a temperature of about 20°–40°C.

10 Claims, No Drawings

PRODUCTION OF SUBSTITUTED ETHERS OF -2-PYRROLIDINONES

REFERENCE TO RELATED APPLICATION

The present application is a continuation-in-part of applicants' earlier filed, co-pending application filed Mar. 27, 1970, under Ser. No. 23,448, entitled "SUBSTITUTED ETHERS OF 2-PYRROLIDINONES", and now abandoned.

BACKGROUND OF THE INVENTION

1. Field of the Invention

This invention relates to substituted ether derivatives of N-hydroxymethyl-2-pyrrolidinone and methods for their production.

2. Description of the Prior Art

N-hydroxymethyl pyrrolidinone is a compound known in the art as an intermediate in the preparation of dyestuffs. As taught in U.S. Pat. No. 3,073,843, this material is prepared by the reaction of pyrrolidinone and formaldehyde or a precursor of formaldehyde. This patent does not suggest the formation of other derivatives of this compound, however. In addition, Chemical Abstracts, Volume 55, page 27267h (1961) discloses the reaction of N-chloromethyl-2-pyrrolidinone with a mixture of sodium methylate and methanol to yield 64 percent of N-methoxymethyl-2-pyrrolidinone. Other ether derivatives of this compound are not taught in this reference, however. Also, Chemical Abstracts, Volume 54, page 1286f (1960) teaches that N-chloromethyl-2-pyrrolidinone can be prepared in 87 percent yield by treatment of the methylol derivative with $SOCl_2$ in benzene solvent at 8°C.

In none of these prior art teachings, however, are there suggestions for preparation of the novel ether derivative of N-methyl pyrrolidinone of this invention, especially as prepared by the novel process disclosed herein.

SUMMARY OF THE INVENTION

It is accordingly one object of the invention to provide ether derivatives of N-hydroxymethyl-2-pyrrolidinone.

A further object of the invention is to provide novel methods for preparation of N-substituted ethers of 2-pyrrolidinones.

Other objects and advantages of the present invention will become apparent as the description thereof proceeds.

In satisfaction of the foregoing objects and advantages there are provided by this invention ether derivatives of N-methyl-2-pyrrolidinones which have the following structural formula:

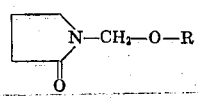

wherein R is a hydrocarbon group or a substituted hydrocarbon group. Also provided is a novel process for preparation of these compounds which comprises reacting N-hydroxymethyl-2-pyrrolidinone with an alcohol of the formula R-OH, wherein R is as above, in the presence of an acid catalyst.

DETAILED DESCRIPTION OF THE INVENTION

As indicated above, this invention is concerned with ether derivatives of N-methyl-2-pyrrolidinone which are useful as organic solvents, especially for polymeric materials. These materials are obtained in excellent yields by the novel process disclosed herein.

As indicated the products have the following general structural formula:

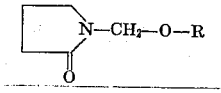

wherein R is a hydrocarbon or substituted hydrocarbon group.

Representative hydrocarbon groups for R include the following:

a. Alkyl groups and substituted alkyl groups of 1 to about 18 carbon atoms, either straight or branched chained, e.g., methyl, ethyl, n-propyl, isopropyl, n-butyl, isobutyl, n-pentyl, n-hexyl, nonyl, decyl undecyl, dodecyl, tridecyl, octadecyl, etc., hydroxymethyl, 2-hydroxyethyl, 3-hydroxypropyl, haloalkyl, e.g., chloromethyl, chloroethyl, etc., and the like;

b. Unsaturated carbon chains of 1 to 18 carbons such as alkenyl (e.g., ethenyl, propenyl, etc.) and alkynyl (e.g., propargyl, butynyl, etc.);

c. Cycloalkyl groups of 3 to about 8 carbon atoms such as cyclopropyl, cyclobutyl, cyclopentyl, cyclohexyl, cycloheptyl and cyclooctyl;

d. Aryl groups and substituted aryl groups of about 6 to about 15 carbon atoms, e.g., phenyl, o-, m- and p-xylyl, tolyl, phenyl substituted by one or more alkyl groups of 1 to 7 carbon atoms, 1-naphthyl, 2-naphthyl and the like; and e. Aralkyl groups such as benzyl, phenethyl and the like.

Of the above compounds, those especially preferred are those containing alkyl groups of 8 to about 18 carbon atoms, i.e., higher alkyl, as these compounds are useful as surface active agents. The lower alkyl ethers, e.g., N-methoxymethyl-2-pyrrolidinone, are compounds known in the art as indicated in the Chemical Abstracts article referred to above. However, the novel process disclosed herein is useful for preparation of both the lower alkyl and higher alkyl ether derivatives. The alkenyl, alkynyl, cycloalkyl, aryl, alkaryl and aralkyl ether derivatives as described above are believed novel and also represent preferred compounds of this invention.

As indicated above, the products of this invention have various uses. Thus, they are good and unusual organic solvents, especially since they contain an ether moiety and a lactam moiety. Thus, the compounds are advantageous as selective solvents for vinyl chloride polymers and copolymers, polyamides, polyacrylates, polyvinyl alcohol and the like, as well as for herbicides, insecticides, fungicides and the like, and for organic syntheses. The compounds are especially useful solvents for highly chlorinated insecticides such as Deldrin and this material may be applied from these solvents. Also, when the R group is a long-chain alkyl group (i.e., 8–18 carbon atoms) or an alkyl benzene group, the products have useful properties as surfactants, the alkyl or alkyl benzene group being an hydrophobic group and the lactam group being an hydrophilic group so that the products have the proper hydrophobic-hydrophilic balance to be useful as surface active agents.

The products of this invention are prepared by the reaction of N-hydroxymethyl-2-pyrrolidinone (prepared as described in U.S. Pat. No. 3,073,843 by the reaction of 2-pyrrolidinone with formaldehyde or a formaldehyde-liberating substance in the presence of an alkaline catalyst) with an alcohol of the formula:

R—OH wherein R is as defined above. Preferred alcohols for use in this invention within the scope of the above formula are ethylene glycol, propylene glycol, tridecyl alcohol, methyl alcohol, ethyl alcohol, n-propyl alcohol, octadecyl alcohol, nonyl alcohol, cyclohexaanol, phenol, propargyl alcohol, tolylol, xylol, chloroethanol, 1-naphthol, 2-naphthol, benzyl alcohol, phenethyl alcohol and the like.

The reaction is conducted by contacting the N-hydroxymethyl-2-pyrrolidinone and alcohol in substantially stoichiometric ratios in the presence of an acid catalyst. The acid catalyst is employed in catalytic amounts, ranging generally from about 0.1 to about 0.25 molar ratios based on the pyrrolidinone reactant employed although larger amounts of said acid catalyst can also be employed within the scope of the invention. For example, the acid catalyst can also be employed in such larger amounts, generally up to approximately one-half molar ratios or more based on the pyrrolidinone reactant although it will be appreciated that the lower range of catalyst content set forth above is generally sufficient and preferred. The acid catalyst may be either an inorganic acid, an organic acid or mixtures thereof. Suitable acid catalysts which may be used include mineral acids such as hydrochloric acid, sulfuric acid, phosphoric acid, phosphonic acid, nitric acid and the like. Organic acid catalysts which may be used include acetic acid, para-toluenesulfonic acid, benzenesulfonic acid, methane-sulfonic acid, trichloroacetic acid and the like.

The reaction is conducted by charging the 2-pyrrolidinone and alcohol to a reaction flask at about room temperature, warming until solution is obtained and adding the acid catalyst gradually while cooling. A solvent for the reactants is not necessary but the reaction proceeds well if a sufficient excess of the alcohol is used to act as a solvent. Under these conditions, the reaction proceeds well to provide yields of over 80 percent of the ether derivative after only about 2 hours reaction time at room temperature, i.e., about 20° to 40°C. After the reaction is complete, the resulting mixture is then neutralized to take care of the excess acid by the gradual addition of a base, preferably about a 10–60 percent aqueous solution of an alkali metal hydroxide (e.g., NaOH, KOH or LiOH), or an alkaline earth metal hydroxide. Also alkaline earth metal or alkali metal oxides, carbonates, bicarbonates may be used for the neutralization as well as mixtures of such bases. There will then result a mixture having a pH of about 10.

After neutralization, the excess liquid (water and excess alcohol), is removed as by evaporation and the precipitated salts removed by filtration followed preferably by elution of the filtered salt cake with an organic solvent such as benzene. This latter step aids in increasing the yield. The product may then be isolated and purified as by distillation at reduced pressure.

The following examples are provided to illustrate the products and processes of the invention, but it is not to be considered as limited thereto. All parts and proportions referred to herein and in the appended claims are by weight unless otherwise specifically indicated.

EXAMPLE I

Fifty-eight grams (0.5 mole) of N-hydroxymethyl-2-pyrrolidinone and 128 grams absolute methanol were warmed to 60°C in a 500 ml. flask on a steam bath until a complete solution resulted. The solution was cooled in an ice-water bath to 10–15°C and 25 grams, 0.25 mole; sp. g. 1.190 of concentrated (37.67 grams) hydrochloric acid was added dropwise during 5 minutes. The mixture was allowed to warm to room temperature and was held at this temperature for 2 hours. The hydrochloric acid was then neutralized by the gradual addition of 20 grams 50 percent sodium hydroxide solution to pH 10. The mixture was placed on the rotary flash evaporator for several hours using steam heat and the vacuum from the house line. The precipitated salts were removed by filtration in a Buchner funnel and the salt cake was washed with 50 ml. benzene. The combined filtrates were again stripped in the rotary flash evaporator to remove benzene and remaining traces of methanol and water. The residue was placed in a distillation flask equipped with a 6 × ¾ inch Vigreaux column and a still head. The fraction (57.5 grams) distilling at 46°–48°C/0.2 mm. represented 89 percent of the theoretical yield ($n_D^{25}$ 1.4630). The ether derivative has the following structure:

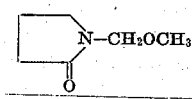

For $C_6H_{11}NO_2$ % N Calcd.    Found
                            10.85      10.84

EXAMPLE II

Fifty-eight grams (0.5 mole) of N-hydroxymethyl-2-pyrrolidinone and 300 grams tridecanol were warmed to 60°C in 1,000 ml. flask on a steam bath until a complete solution resulted. The solution was then cooled in an ice-water bath to 10°–12°C and 25 grams, 0.25 mole; sp. g. 1.190 of concentrated (37.67 g.) hydrochloric acid was added dropwise during 5 minutes. The mixture was allowed to warm to room temperature and was held at this temperature for 2 hours. The hydrochloric acid was then neutralized by the gradual addition of 20 grams 50 percent sodium hydroxide solution to pH 10. The mixture was placed on the rotary flash evaporator for several hours using steam heat and the vacuum from the house line. The precipitated salts were removed by filtration in a Buchner funnel and the salt cake was washed with 75 ml. benzene. The combined filtrates were again stripped in the rotary flash evaporator to remove benzene and remaining traces of alcohol and water. The residue was placed in a distillation flask equipped with a 6 × ¾ inch Vigreaux column and a still head. The ether derivative recovered has the following structure:

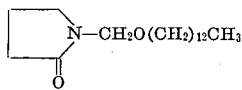

EXAMPLE III

Fifty-eight grams (0.5 mole) of N-hydroxymethyl-2-pyrrolidinone and 125 grams propargyl alcohol were warmed to 60°C in a 500 ml. flask on a steam bath until a complete solution resulted. The solution was cooled in an ice-water bath to 10°–15°C and 25 grams, 0.25 mole; sp. g. 1.190 of concentrated (36.67 g.) hydrochloric acid was added dropwise during 5 minutes. The mixture was allowed to warm to room temperature and was held at this temperature for 2 hours. The hydrochloric acid was then neutralized by the gradual addition of 20 grams 50 percent sodium hydroxide solution to pH 10. The mixture was placed on the rotary flash evaporator for several hours using steam heat and the vacuum from the house line. The precipitated salts were removed by filtration in a Buchner funnel and the salt cake was washed with 50 ml. benzene. The combined filtrates were again stripped in the rotary flash evaporator to remove benzene and remaining traces of alcohol and water. The residue was placed in a distillation flask equipped with a 6 × ¾ inch Vigreaux column and a still head. The ether derivative recovered has the following structure:

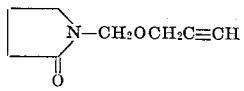

EXAMPLE IV

The reaction of Example I was repeated except that the alcohol used was phenol and the catalyst was p-toluenesulfonic acid. Using the same reaction conditions and work-up procedure, there was obtained a 78.5 percent yield of a product of the following composition:

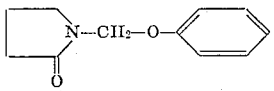

EXAMPLES V–VIII

The reaction of Example I was repeated except that the alcohols employed in each case were as follows:

|  |  |
|---|---|
| V. | Ethylene glycol |
| VI. | n-Butyl alcohol |
| VII. | Benzyl alcohol |
| VIII. | Cyclohexanol |

In every case, good yields of the corresponding substituted oxymethyl-2-pyrrolidinone were obtained.

EXAMPLE IX

The reaction of Example I is also repeated except that the catalytic amount of acid catalyst employed is five grams, 0.05 mole; sp. g. 1.190 of concentrated (7.53 grams) hydrochloric acid using the same reaction conditions and work-up procedure of said Example I, the desired ether derivative having the structural formula set forth in Example I is obtained in high yield in excess of 80 percent.

EXAMPLE X

The reaction of Example I is also repeated using p-toluenesulfonic acid catalyst in a catalytic amount constituting approximately 0.25 molar ratio based on the amount of N-hydroxymethyl-2-pyrrolidinone employed. A high yield of the desired ether derivative is obtained.

EXAMPLES XI, XII, XIII and XIV

The reaction of Example I is repeated using about 0.20 molar ratio of said concentrated hydrochloric acid based on the indicated amount of N-hydroxymethyl-2-pyrrolidinone employed is added following the recited procedure, the reactions being carried out with the following alcohols in place of the methanol of Example I:

|  |  |
|---|---|
| XI. | Ethylene glycol |
| XII. | n-Butyl alcohol |
| XIII. | Benzyl alcohol |
| XIV. | Cyclohexanol |

In each instance, a high yield of the corresponding substituted oxymethyl-2-pyrrolidinone is obtained.

The invention has been described herein with reference to certain preferred embodiments. However, the invention is not to be considered as limited thereto as variations thereon will become obvious to those skilled in the art.

Therefore, we claim:

1. An improved process for the preparation of a compound of the formula:

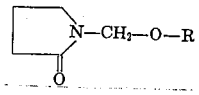

wherein R is selected from the group consisting of methyl, ethyl, n-propyl, isopropyl, n-butyl, isobutyl, n-pentyl, n-hexyl, monyl, decyl, undecyl, dodecyl, tridecyl, octadecyl, hydroxymethyl, 2-hydroxyethyl, 3-hydroxypropyl, chloromethyl, chloroethyl, ethenyl, propenyl, propargyl, butynyl, cyclopropyl, cyclobutyl, cyclopentyl, cyclohexyl, cycloheptyl, cyclooctyl, phenyl, o-, m-, and p-xylyl, tolyl, 1-naphthyl, 2-naphthyl, benzyl and phenethyl, which comprises reacting N-hydroxymethyl-2-pyrrolidinone with an alcohol of the formula:

wherein R is as described above, at a temperature of from about 20°C to about 40°C in the presence of an acid catalyst of the group hydrochloric acid, sulfuric acid, nitric acid, phosphoric acid, phosphonic acid, acetic acid, para-toluenesulfonic acid, benzenesulfonic acid, methane-sulfone acid and trichloroacetic acid, the molar ratio of said acid catalyst to said N-hydroxymethyl-2-pyrrolidinone being in the range of from about 0.1 to about 0.5.

2. The process of claim 1 in which the molar ratio of the pyrrolidinone and said alcohol is about 1:1.

3. The process of claim 2 in which a half molar amount of said acid catalyst is employed based on said pyrrolidinone reactant.

4. The process of claim 1 in which the acid catalyst is selected from the group consisting of mineral acids, organic acids and mixtures thereof.

5. The process of claim 1 in which said molar ratio of acid catalyst to said N-hydroxymethyl-2-pyrrolidinone is from about 0.1 to about 0.25.

6. The process of claim 5 in which said acid catalyst comprises HCl.

7. The process of claim 5 in which said acid catalyst comprises p-toluenesulfonic acid.

8. The process of claim 5 in which said alcohol comprises methanol.

9. The process of claim 5 in which said alcohol comprises tridecanol.

10. The process of claim 5 in which said alcohol comprises ethylene glycol.

* * * * *